(12) United States Patent
Weaver et al.

(10) Patent No.: US 8,303,110 B1
(45) Date of Patent: Nov. 6, 2012

(54) NOSE PADS FOR A WEARABLE DEVICE HAVING AN ELECTRICALLY-CONTROLLABLE HARDNESS

(75) Inventors: Josh Weaver, San Jose, CA (US); Michael Johnson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/229,729

(22) Filed: Sep. 11, 2011

(51) Int. Cl.
*G02C 1/00* (2006.01)

(52) U.S. Cl. .............................. 351/82; 351/78; 351/136

(58) Field of Classification Search .................... 351/78, 351/82, 136, 139, 41
See application file for complete search history.

(56) References Cited

U.S. PATENT DOCUMENTS

| | | | |
|---|---|---|---|
| 4,190,334 A | 2/1980 | O'Neil | |
| 4,251,302 A | 2/1981 | Leonard et al. | |
| 5,345,616 A | 9/1994 | Wiedner | |
| 5,885,675 A | 3/1999 | Martin | |
| 7,004,655 B2 | 2/2006 | Ferrara | |
| 7,066,064 B1 | 6/2006 | Varady | |
| 7,111,936 B1 | 9/2006 | Chuang | |
| 7,438,410 B1 | 10/2008 | Howell et al. | |
| 7,500,747 B2 | 3/2009 | Howell et al. | |
| 7,589,714 B2 | 9/2009 | Funaki | |
| 7,594,280 B2 | 9/2009 | Lindahl | |
| 7,621,634 B2 | 11/2009 | Howell et al. | |
| 7,677,723 B2 | 3/2010 | Howell et al. | |
| 7,826,113 B2 | 11/2010 | Noda | |
| 2004/0136769 A1* | 7/2004 | Ferrara | 401/6 |
| 2006/0099808 A1 | 5/2006 | Kondo | |
| 2006/0132382 A1 | 6/2006 | Jannard | |
| 2008/0139257 A1 | 6/2008 | Dai et al. | |
| 2009/0133976 A1 | 5/2009 | Bose et al. | |
| 2010/0149073 A1 | 6/2010 | Chaum et al. | |
| 2011/0080289 A1 | 4/2011 | Minton | |

FOREIGN PATENT DOCUMENTS

| | | |
|---|---|---|
| EP | 1065404 A2 | 3/2001 |
| EP | 2098747 A1 | 9/2009 |
| GB | 2450545 A | 12/2008 |
| WO | WO2006055884 A2 | 5/2006 |

OTHER PUBLICATIONS

Han G. and Choi S., "Extended Rate-Hardness: A Measure for Perceived Hardness," A.M.L. Kappers et al. (eds): EuroHaptics 2010, Part I, LNCS 6191, p. 117-124, published in 2010. Retrieved on-line on Jun. 13, 2011 from http://hvr.postech.ac.kr/wp-content/uploads/2010/03/C46.GHan_Eurohaptics2010.pdf.

Han G, Jeon S. Choi S, "Improving Perceived hardness of Haptic Rendering via Stiffness Shifting: An Initial Study," ACM proceeding of VRST 2009, Kyoto, Japan, Nov. 18-20, 2009, p. 87-90. Retrieved on-line on Jun. 13, 2011 from: http://www.sciweavers.org/publications/improving-perceived-hardness-haptic-rendering-stiffness-shifting-initial-study.

(Continued)

*Primary Examiner* — Hung Dang

(74) *Attorney, Agent, or Firm* — McDonnell Boehnen Hulbert & Berghoff LLP

(57) ABSTRACT

Described herein are systems and methods for adjusting a hardness of a nosepiece on a heads-up display. In one example, a wearable device is provided that includes a nosepiece comprising a coating and a fluid within the coating, wherein the fluid has an electrically-controllable hardness.

12 Claims, 8 Drawing Sheets

OTHER PUBLICATIONS

Pfeiffer C, Mavroidis C, Bar-Cohen-Y, Dolgin B, "Electrorheological Fluid Based Force Feedback Device," Proceedings of the 1999 SPIE Telemanipulator and Telepresence Technologies VI Conference, Boston, MA, Sep. 19-22, 1999, vol. 3840, p. 88-99. Retrieved on-line on Jun. 13, 2011 from http://www.robots.neu.edu/papers/spie_telepresence51.PDF.

* cited by examiner

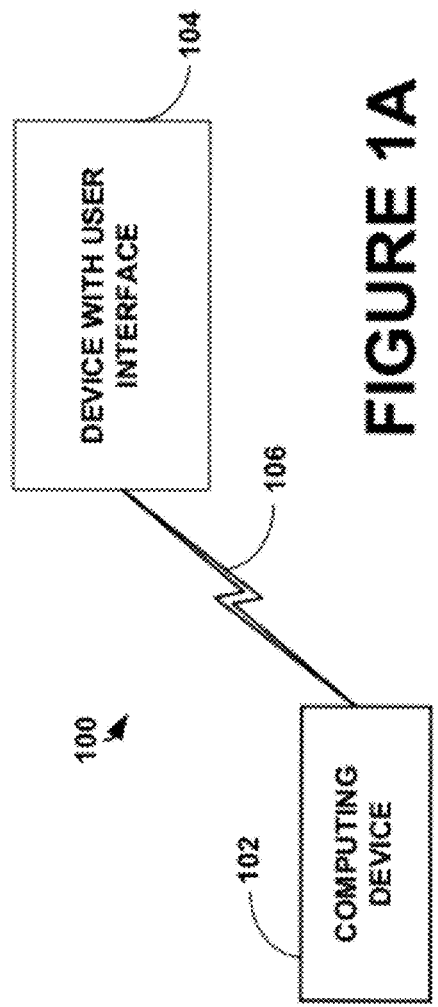
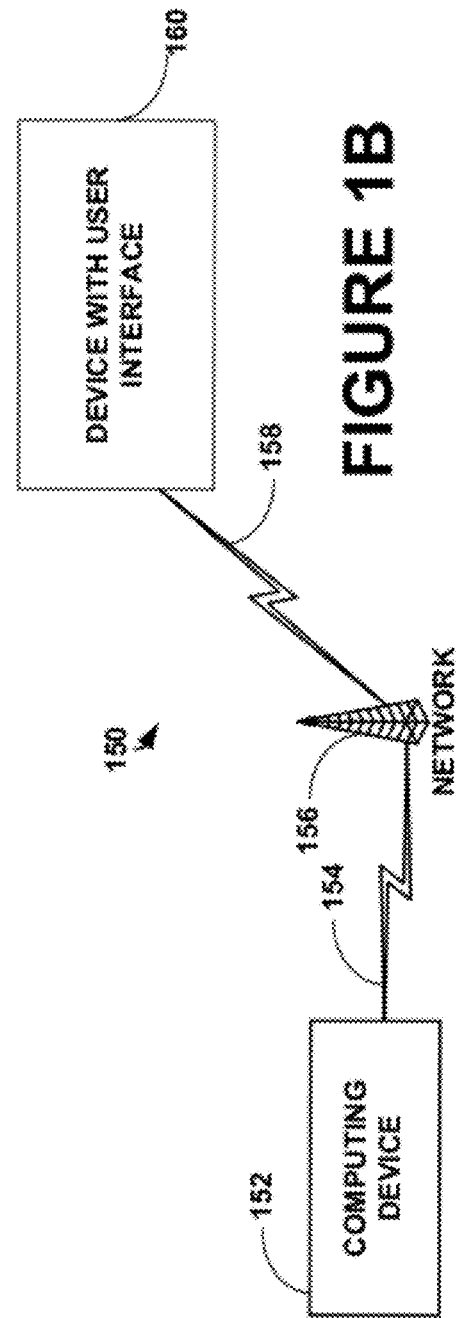

NOSE PADS FOR A WEARABLE DEVICE HAVING AN ELECTRICALLY-CONTROLLABLE HARDNESS

BACKGROUND

Unless otherwise indicated herein, the materials described in this section are not prior art to the claims in this application and are not admitted to be prior art by inclusion in this section.

Numerous technologies can be utilized to display information to a user of a system. Some systems for displaying information may utilize "heads-up" displays. A heads-up display is typically positioned near the user's eyes to allow the user to view displayed images or information with little or no head movement. To generate the images on the display, a computer processing system may be used. Such heads-up displays have a variety of applications, such as aviation information systems, vehicle navigation systems, and video games.

A heads-up display may be included within or provided by a number of devices. One example device includes a head-mounted display. A head-mounted display can be incorporated into a pair of glasses, or any other item that a user wears on his or her head. A user may desire to adjust the head-mounted display so that the head-mounted display comfortably remains in place on the user's face.

SUMMARY

The present application discloses, inter alia, systems and methods for adjusting a hardness of a nosepiece on a wearable device.

In one example, a wearable device is provided. The wearable device includes a nosepiece comprising a coating and a fluid within the coating, wherein the fluid has an electrically-controllable hardness.

In another example, a method of changing the hardness of a nosepiece on a wearable device is provided. The method comprises receiving an input to change the hardness of a nosepiece, and causing a magnetic field to be applied to a fluid in the nosepiece.

In yet another example, an article of manufacture including a tangible computer-readable media having computer-readable instructions encoded thereon is provided. The instructions comprise receiving an input to change a hardness of a nosepiece, and causing a magnetic field to be applied to a fluid in the nosepiece.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures:

FIG. 1A is a schematic drawing of a computer network infrastructure according to an example embodiment of the present application;

FIG. 1B is a schematic drawing of another computer network infrastructure according to an example embodiment of the present application;

DETAILED DESCRIPTION

Figure 1C:
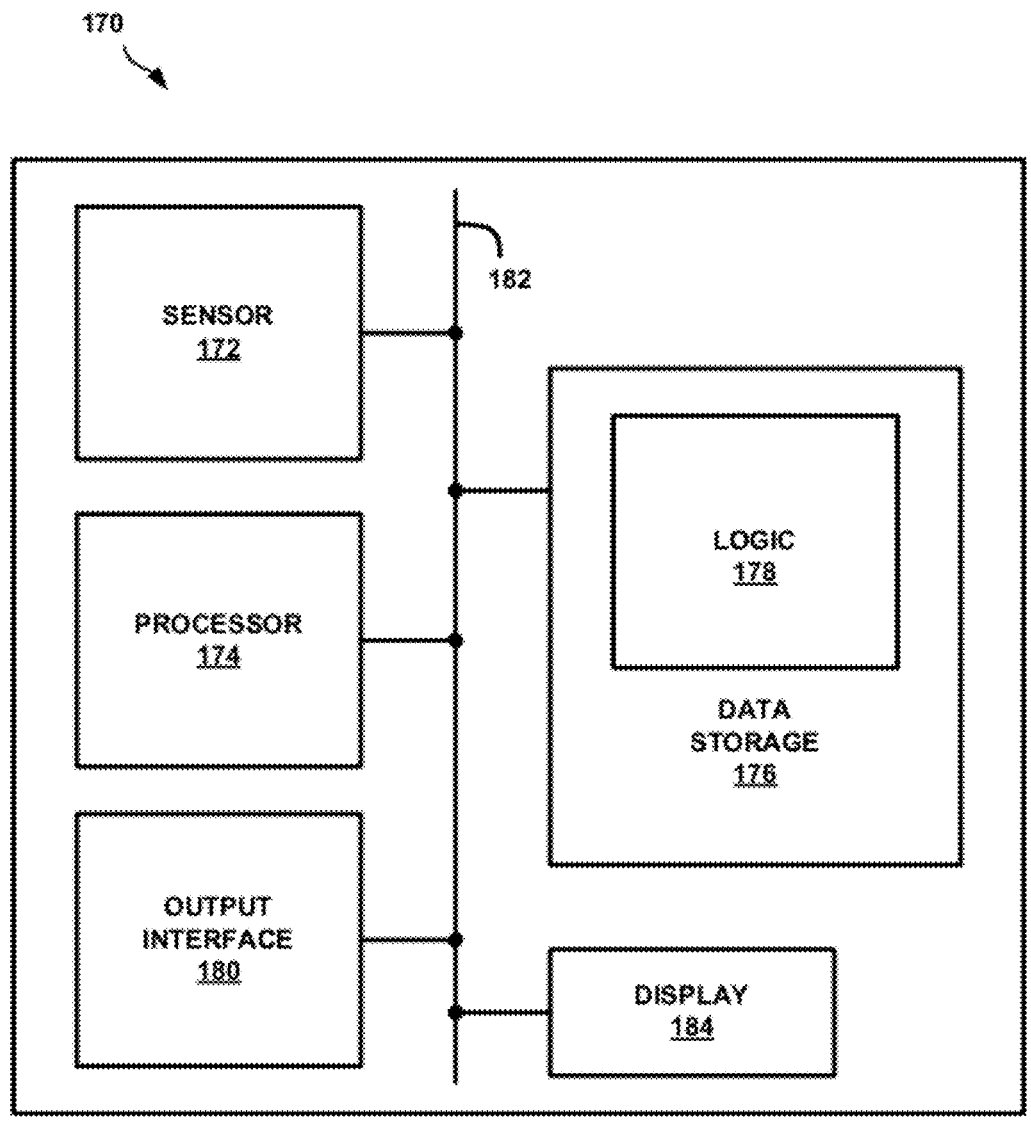
FIG. 1C is a functional block diagram illustrating an example device.

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview of Systems for Display of Items on a User Interface

FIG. 1A is a schematic drawing of a computer network infrastructure 100 according to an example embodiment of the present application. In the infrastructure 100, a computing device 102 is coupled to a device with a user interface 104 with a communication link 106. The device with user interface 104 may contain hardware to enable a wireless communication link. The computing device 102 may be a desktop computer, a television device, or a portable electronic device such as a laptop computer or cellular phone, for example. The communication link 106 may be used to transfer image or textual data to the user interface 104 or may be used to transfer unprocessed data, for example.

The device with user interface 104 may be a head-mounted display, such as a pair of glasses or other helmet-type device that is worn on a user's head. Further details of the device 104 are described herein, with reference to FIGS. 1C and 2-3, for example.

The communication link 106 connecting the computing device 102 with the device with user interface 104 may be implemented using one of many communication technologies. For example, the communication link 106 may include a wired link via a serial bus such as USB, or a parallel bus. A wired connection may be a proprietary connection as well. The communication link 106 may also include a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

FIG. 1B is a schematic drawing of another computer network infrastructure 150 according to an example embodiment of the present application. In the infrastructure 150, a computing device 152 is coupled via a first communication link 154 to a network 156. The network 156 may be coupled via a second communication link 158 to a device with user interface 160. The user interface 160 may contain hardware to enable a wireless communication link. The first communication link 154 may be used to transfer image data to the network 156 or may transfer unprocessed data. The device with user interface 160 may contain a processor to compute the displayed images based on received data.

Although the communication link 154 is illustrated as a wireless connection, wired connections may also be used. For example, the communication link 154 may include a wired link via a serial bus such as a universal serial bus or a parallel bus. A wired connection may be a proprietary connection as well. The communication link 154 may also include a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Additionally, the network 156 may provide the second communication link 158 by a different radio frequency based network, and may be any communication link of sufficient bandwidth to transfer images or data, for example.

Components in the infrastructures 100 or 150 may be configured to receive data corresponding to an image. The data received may be a computer image file, a computer video file, an encoded video or data stream, three-dimensional rendering data, or openGL data for rendering. In some examples, the data may also be sent as plain text. The text could be rendered into objects or the infrastructures 100 or 150 could translate the text into objects. To render an image, the infrastructures 100 or 150 may process and write information associated with the image to a data file before presenting for display, for example.

Figure 2:
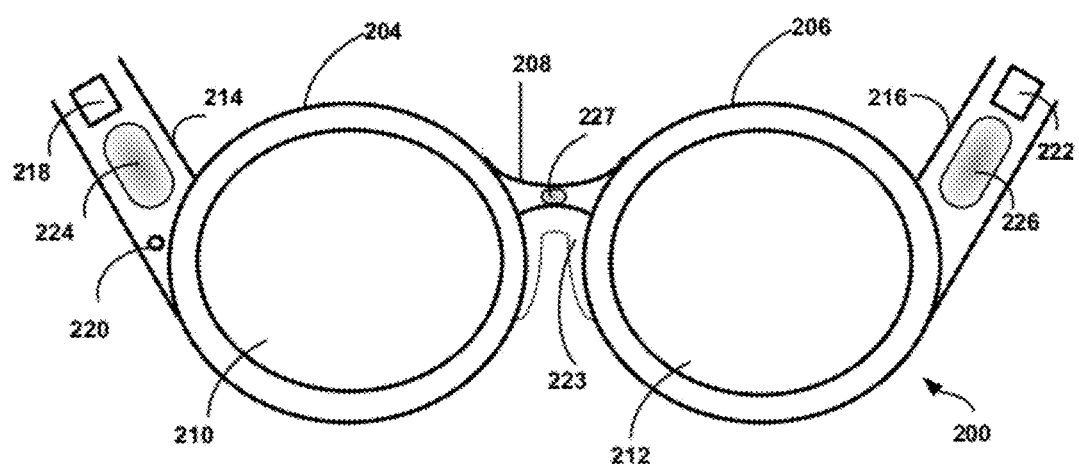
FIG. 2 illustrates an example system for receiving, transmitting, and displaying data.
Figure 3:
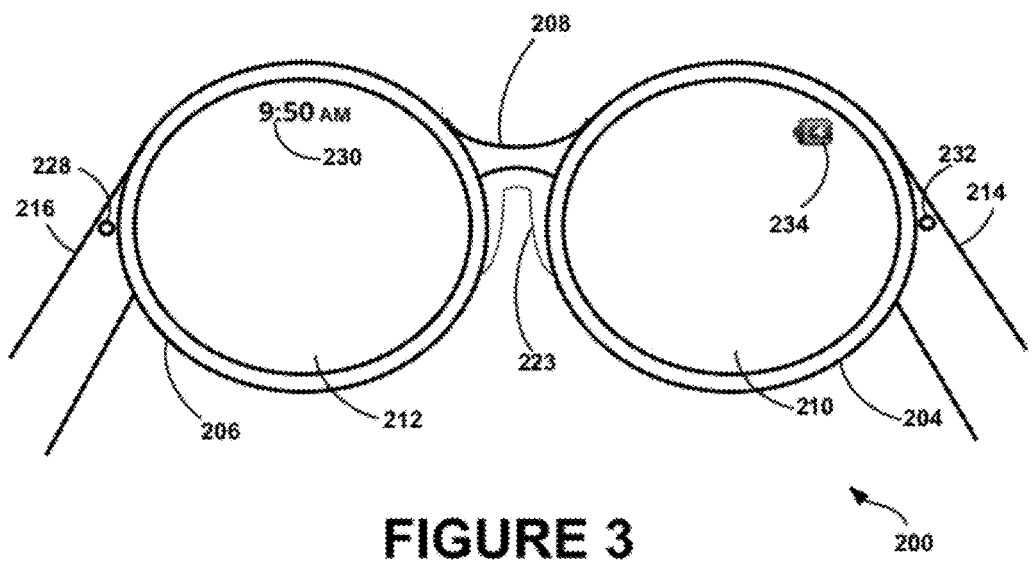
FIG. 3 illustrates an alternate view of the system of FIG. 2.

FIG. 1C is a functional block diagram illustrating an example device 170. In one example, the device 104 in FIG. 1A or the device 160 in FIG. 1B may take the form of the device 170 shown in FIG. 1C. The device 170 may include a wearable computing device, such as a pair of goggles or glasses, as shown in FIGS. 2-3. However, the device 170 may take other forms.

As shown, the device 170 comprises a sensor 172, a processor 174, data storage 176, logic 178, an output interface 180, and a display 184. Elements of the device 170 are shown coupled by a system bus 182 or other mechanism.

Each of the sensor 172, the processor 174, the data storage 176, the logic 178, the output interface 180, and the display 184 are shown to be integrated within the device 170; however, the device 170 may, in some examples, comprise multiple devices among which the elements of device 170 can be distributed. For example, sensor 172 may be separate from (but communicatively connected to) the remaining elements of device 170, or sensor 172, processor 174, output interface 180, and display 184 may be integrated into a first device, while data storage 176 and the logic 178 may be integrated into a second device that is communicatively coupled to the first device. Other examples are possible as well.

Sensor 172 may include one or more of a pressure sensor, a proximity sensor, a gyroscope, or an accelerometer, to name some examples, and may be configured to determine and measure a pressure change, a user's proximity to the device 170, or an orientation and/or an acceleration of movement of the device 170 as the user positions or moves to position the device 170 on the user's face, for example.

Processor 174 may be or may include one or more general-purpose processors and/or dedicated processors, and may be configured to compute displayed images based on received data. The processor 174 may be configured to perform an analysis on the orientation, movement, or acceleration determined by the sensor 172 so as to produce an output.

The logic 178 may be executed by the processor 174 to perform functions. In one example, the functions may include increasing or decreasing a viscosity and/or rigidity of a nosepiece on the device 170. The processor 174 may be configured to cause a magnetic field to be applied or removed from the nosepiece of the device 170 so as to increase or decrease the viscosity and/or rigidity of the nosepiece. When a user selects an input to change the hardness of a nosepiece or the sensor 172 detects a user positioning a nosepiece on the device 170, the logic 178 may be further executed by processor 174 to perform functions that include running a program or displaying an application, for example.

The output interface 180 may be configured to transmit an output to display 184. The output may include any type of data or image for display, for example. To this end, the output interface 180 may be communicatively coupled to the display 184 through a wired or wireless link. Upon receiving the output from the output interface 180, the display 184 may display the output to a user.

In some examples, the device 170 may also include a power supply, such as a battery pack or power adapter. For example, the device 170 may be tethered to a power supply through a wired or wireless link. Other examples are possible as well. The device 170 may include elements instead of and/or in addition to those shown.

FIG. 2 illustrates an example device 200 for receiving, transmitting, and displaying data. The device 200 is shown in the form of a wearable computing device, and may take the form of one of the devices 104 or 160 of FIGS. 1A and 1B, for example. While FIG. 2 illustrates eyeglasses as an example of a wearable computing device, other types of wearable computing devices could additionally or alternatively be used. As illustrated in FIG. 2, the device 200 comprise frame elements including lens-frames 204 and 206 and a center frame support or bridge 208, lens elements 210 and 212, and extending side-arms 214 and 216. The center frame support 208 and the extending side-arms 214 and 216 are configured to secure the device 200 to a user's face via a user's nose and ears, respectively. Each of the frame elements 204, 206, and 208 and the extending side-arms 214 and 216 may be formed of a solid structure of plastic or metal, or may be formed of a hollow structure of similar material so as to allow wiring and component interconnects to be internally routed through the device 200. Each of the lens elements 210 and 212 may be formed of any material that can suitably display a projected image or graphic. Each of the lens elements 210 and 212 may also be sufficiently transparent to allow a user to see through the lens element. Combining these two features of the lens elements can facilitate an augmented reality or heads-up display where the projected image or graphic is superimposed over a real-world view as perceived by the user through the lens elements, for example.

The extending side-arms 214 and 216 are each projections that extend away from the frame elements 204 and 206, respectively, and can be positioned behind a user's ears to secure the device 200 to the user. The extending side-arms 214 and 216 may further secure the device 200 to the user by extending around a rear portion of the user's head. Additionally or alternatively, for example, the device 200 may connect to or be affixed within a head-mounted helmet structure. Other possibilities exist as well.

The device 200 may also include an on-board computing system 218, a video camera 220, a sensor 222, a nosepiece 223, and finger-operable touch pads 224, 226, and 227. The on-board computing system 218 is shown to be positioned on the extending side-arm 214 of the device 200; however, the on-board computing system 218 may be provided on other parts of the device 200. The on-board computing system 218 may include a processor and memory, for example. The on-board computing system 218 may be configured to receive and analyze data from the video camera 220 and the finger-operable touch pads 224, 226, 227 (and possibly from other sensory devices, user interfaces, or both) and generate images for output from the lens elements 210 and 212 as well as to generate a magnetic field.

The video camera 220 is shown to be positioned on the extending side-arm 214 of the device 200; however, the video camera 220 may be provided on other parts of the device 200. The video camera 220 may be configured to capture images at various resolutions or at different frame rates. Many video cameras with a small form-factor, such as those used in cell phones or webcams, for example, may be incorporated into an example of the device 200. Although FIG. 2 illustrates one video camera 220, more video cameras may be used, and each may be configured to capture the same view, or to capture different views. For example, the video camera 220 may be forward facing to capture at least a portion of the real-world view perceived by the user. This forward facing image captured by the video camera 120 may then be used to generate an augmented reality where computer generated images appear to interact with the real-world view perceived by the user.

The sensor 222 is shown mounted on the extending side-arm 216 of the device 200; however, the sensor 222 may be provided on other parts of the device 200. The sensor 222 may include one or more of a pressure sensor, a proximity sensor, a gyroscope or an accelerometer, for example. Other sensing devices may be included within the sensor 222 or other sensing functions may be performed by the sensor 222.

The finger-operable touch pads 224, 226, 227 are shown mounted on the extending side-arms 214, 216 and the center frame support 208 of the device 200. Each of finger-operable touch pads 224, 226, 227 may be used by a user to input commands. The finger-operable touch pads 224, 226, 227 may sense at least one of a position and a movement of a finger via capacitive sensing, resistance sensing, or a surface acoustic wave process, among other possibilities. The finger-operable touch pads 224, 226, 227 may be capable of sensing finger movement in a direction parallel or planar to the pad surface, in a direction normal to the pad surface, or both, and may also be capable of sensing a level of pressure applied. The finger-operable touch pads 224, 226, 227 may be formed of one or more translucent or transparent insulating layers and one or more translucent or transparent conducting layers. Edges of the finger-operable touch pads 224, 226, 227 may be formed to have a raised, indented, or roughened surface, so as to provide tactile feedback to a user when the user's finger reaches the edge of the finger-operable touch pads 224, 226, 227. Each of the finger-operable touch pads 224, 226, 227 may be operated independently, and may provide a different function. In one example, one or more of finger-operable touch pads 224, 226, 227 may be present on the device 200. Alternatively, instead of finger-operable touch pads, the device 200 may comprise finger-operable switches.

The nosepiece 223 is shown mounted on the center frame support 208 of the device 200. The nosepiece 223 may be a separate piece from device 200 that is able to be attached and detached from the device 200. In another example, the nosepiece 223 may be integrally formed on the device 200. The nosepiece 223 may comprise a single piece, as shown in FIG. 2, or may comprise multiple pieces, with one piece affixed to the frame element 204, and another piece affixed to the frame element 206.

FIG. 3 illustrates an alternate view of the device 200 of FIG. 2. As shown in FIG. 3, the lens elements 210 and 212 may act as display elements. The device 200 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210 and 212 may act as a combiner in a light projection system and may include a coating that reflects the light projected onto them from the projectors 228 and 232. In some embodiments, a special coating may not be used (e.g., when the projectors 228 and 232 are scanning laser devices).

In alternative examples, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 204 and 206 for driving such a matrix display. Alternatively or additionally, a laser or LED source and scanning system could be used to draw a raster display directly onto the retina of one or more of the user's eyes. Other possibilities exist as well.

Figure 4A:
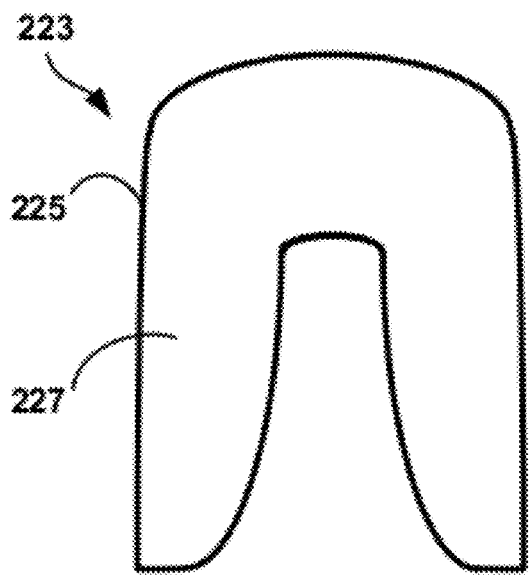
FIG. 4a illustrates an exemplary nosepiece.

FIG. 4a illustrates an example nosepiece 223. The nosepiece 223 is adapted to support a pair of eyeglasses on the nose of a user, such as the device 200 in FIG. 3. The nosepiece 223 may be removably affixable to a pair of eyeglasses, or may be permanently affixed or integrated into the eyeglasses. The nosepiece 223 comprises a coating 225 and a fluid 227 within the coating 225. The fluid 227 includes a fluid in which a viscosity can be increased or decreased with an application of a magnetic field or an electric field. The fluid may be such that, when the viscosity of the fluid 227 is increased, the fluid becomes a viscoelastic solid. In one example, the fluid 227 may include a magnetorheological fluid. In another example, the fluid 227 may include an electrorheological fluid.

Figure 4B:
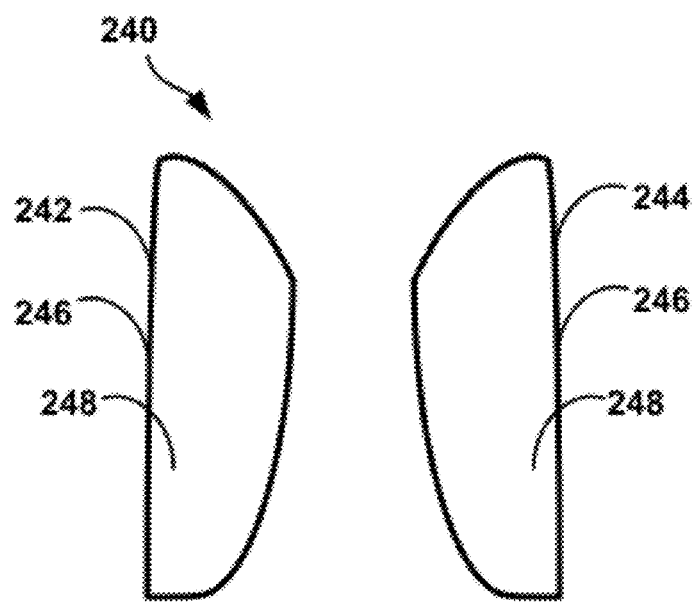
FIG. 4b illustrates an exemplary nosepiece.

Even though nosepiece 223 is shown in FIG. 4 as a single piece, as previously noted, in an alternate example the nosepiece may comprise two pieces, with one piece adaptable to be affixed to the frame element 204, and the other piece affixed to the frame element 206. FIG. 4b illustrates an example nosepiece 240 comprising two pieces. A first piece 242 may be adapted to be removably affixed to or manufactured as part of the frame element 204, and a second piece 244 may be adapted to be removably affixed to or manufactured as part of the frame element 206 of a device such as the device 200 in FIGS. 2 and 3. Each of the first piece 242 and the second piece 244 comprises a coating 246 and a fluid 248 within the coating 246. The fluid 246 includes a fluid in which a viscosity can be increased or decreased with an application of a magnetic field or an electric field. The fluid may be such that, when the viscosity of the fluid 246 is increased, the fluid becomes a viscoelastic solid. In one example, the fluid 246 may include a magnetorheological fluid. In another example, the fluid 246 may include an electrorheological fluid.

2. Example Methods

Figure 5A:
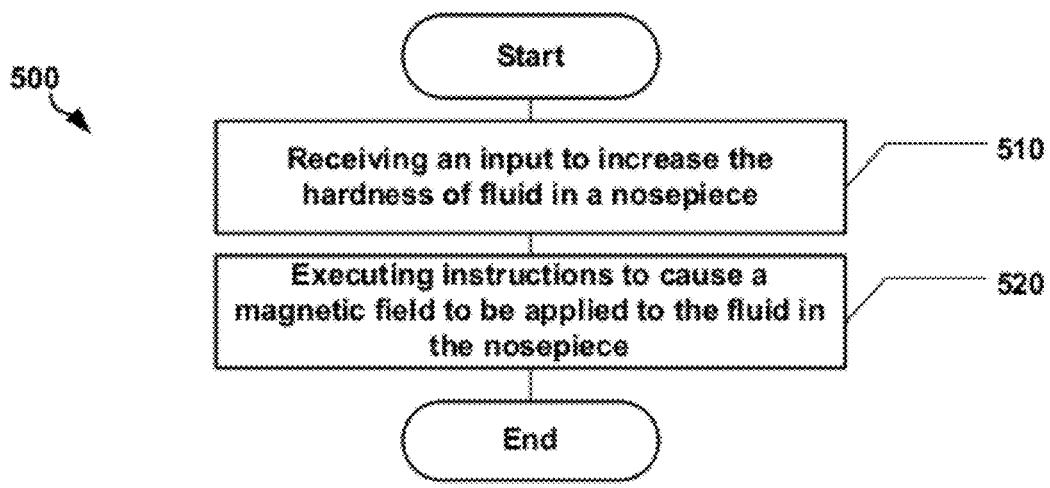
FIG. 5a is a flowchart of an illustrative method for changing the hardness of a nosepiece in accordance with one aspect of the present application.
Figure 5B:
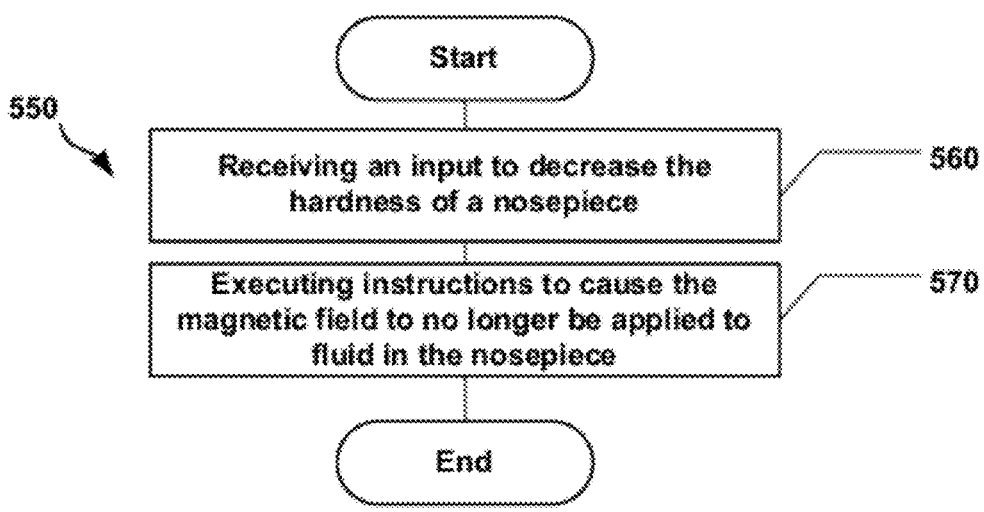
FIG. 5b is a flowchart of another illustrative method for changing the hardness of a nosepiece in accordance with one aspect of the present application.

FIGS. 5a and 5b are flowcharts of illustrative methods 500 and 550, respectively, for changing hardness of a nosepiece in accordance with one aspect of the present application. Methods 500 and 550 may include one or more operations, functions, or actions as illustrated by one or more of blocks 510-520 and 560-570. Although the blocks are illustrated as two methods, these blocks may be combined to comprise a single method, and these blocks may also be performed in parallel, and/or in a different order than those described herein. Also, the various blocks may be combined into fewer blocks, divided into additional blocks, and/or eliminated based upon the desired implementation.

In addition, for the methods 500 and 550 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the methods 500 and 550 and other processes and methods disclosed herein, each block in FIGS. 5a and 5b may represent circuitry that is wired to perform the specific logical functions in the process.

Method 500 shown in FIG. 5a presents an embodiment of a method that, for example, could be used with infrastructures 100 and 150.

Initially, the method 500 includes receiving an input to increase the hardness of fluid in a nosepiece, at block 510. The input may be sent to a device, such as the devices 104 or 160 of FIGS. 1A and 1B, via a user-operable touchpad. In another example, the input may be sent to the device via a user-operable switch. The touchpads or the switches may be mounted on the device in a variety of configurations, as previously described with reference to FIGS. 2 and 3.

The method 500 also includes executing instructions to cause a magnetic field to be applied to the fluid in the nosepiece, at block 520. The intensity of the magnetic field may be controlled. An inductive coil may be located on either side of the nosepiece to generate a directional field through the magnetorheological fluid inside the nosepiece. Having an inductive coil on either side of the nosepiece maintains a high field strength in the area of the nosepiece. By applying a constant current through the coil, a magnetic field is generated along the axis of the coil. The field between the coils in the magnetorheological fluid would be fairly straight through the fluid.

In response to the application of the magnetic field, the viscosity of the fluid changes. In the example embodiment where the fluid is a magnetorheological fluid, the magnetic field may be caused by electrons moving through circuits in the hands-free device. When the magnetic field is applied to a magnetorheological fluid, for example, randomly distributed magnetic particles suspended within a carrier oil align along lines of magnetic flux, containing and restricting movement of the fluid perpendicular to the direction of flux, effectively increasing the viscosity of the fluid. The viscosity may thus increase with application of the magnetic field to the point of becoming a viscoelastic solid. The hardening process may take fractions of a second, for example. The hardening effect can vary depending on the composition of the fluid and the size, shape, and strength of the magnetic field.

In another embodiment, the fluid may be an electrorheological fluid. In this embodiment, the method may include executing instructions to cause an electric field to be applied to the fluid in the nosepiece. The electric field may be generated by capacitive plates situated on either side or around the nosepiece. The capacitive plates may be made to be part of the nosepiece or may be part of the device. The plates may be made of metal or other substances that can act as a capacitor. In response to the application of the electric field, the viscosity of the fluid changes. The viscosity may thus increase with application of the electric field to the point of becoming a viscoelastic solid.

In yet another embodiment, in addition to application of a magnetic field or an electric field, a compression of the fluid may also be implemented. The compression of the fluid may be accomplished in a number of ways, such as, for example, by having a small actuator press on a side or sides of the nosepiece.

Method 550 shown in FIG. 5b presents an embodiment of a method that, for example, could be used with infrastructures 100 and 150.

Initially, the method 550 includes receiving an input to decrease the hardness of a nosepiece, at block 560. A computing device, such as the computing devices 102 or 152 of FIGS. 1A and 1B, for example, may receive this input, which may come from a user-operable touchpad or switch.

The method 550 includes executing instructions to cause the magnetic field to no longer be applied to fluid in the nosepiece, at block 570. A processor within the computing device may be configured to process the input information data and to execute the instructions.

As a result of the removal of the application of the magnetic field, the viscosity of the fluid is decreased. Halting the current of electrons would remove the application of the magnetic field, which would then go to zero, and as a result, the fluid in the nosepiece would decrease in viscosity and/or rigidity. The nosepiece would thus become malleable once again.

In this manner as discussed with reference to FIGS. 5a and 5b, fluid within a nosepiece may be hardened and softened for repeated manipulation by a user.

Figure 6:
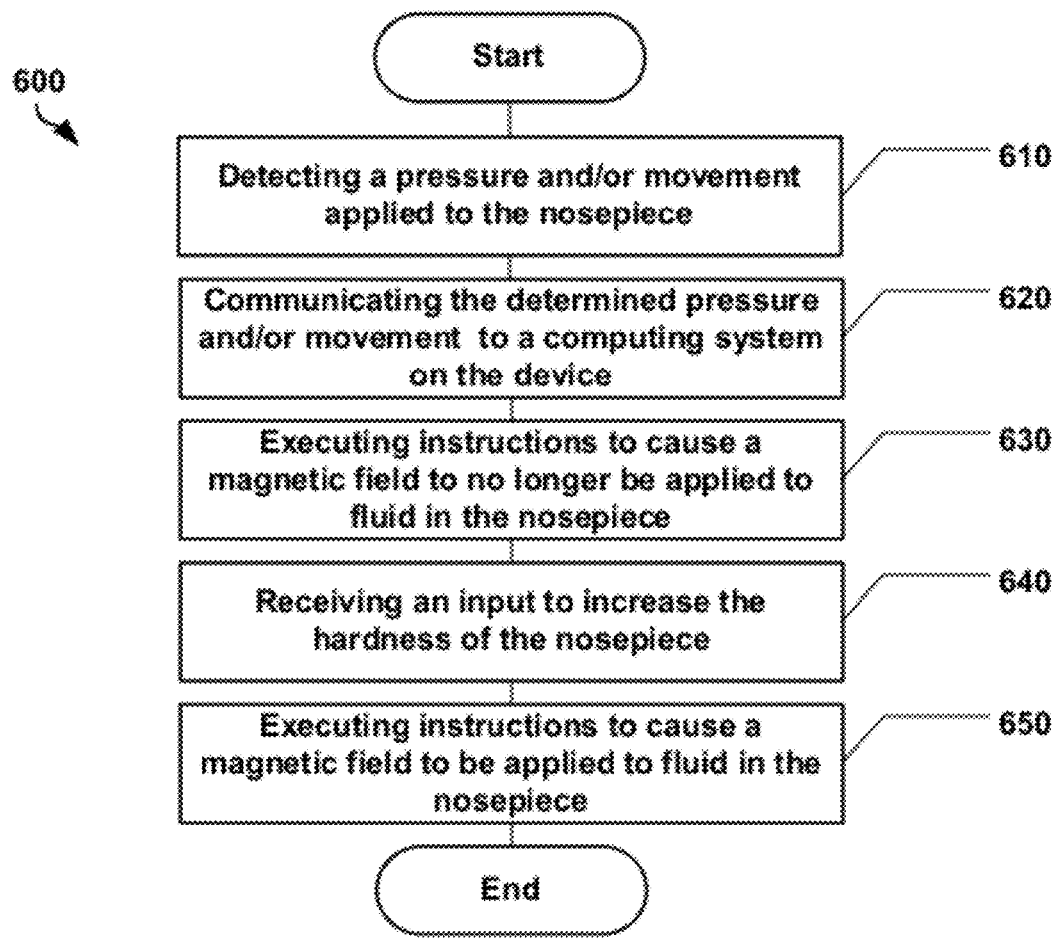
FIG. 6 is a flowchart of another illustrative method for changing the hardness of a nosepiece in accordance with one aspect of the present application.

FIG. 6 is a flowchart of an illustrative method 600 for changing the hardness of a nosepiece in accordance with one aspect of the application. Method 600 shown in FIG. 6 presents an embodiment of a method that, for example, could be used with infrastructures 100 and 150. Method 600 may include one or more operations, functions, or actions as illustrated by one or more of blocks 610-650. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Initially, the method 600 includes detecting a pressure and/or a movement applied to or near the nosepiece, at block 610. For example, an instrument, such as a sensor, may be used to determine a movement of or a change in pressure exerted upon the nosepiece or a movement near the nosepiece. The sensor may be mounted on or may be part of a device as previously described with reference to the sensors of FIG. 1C and FIGS. 2-3. The sensor may detect a pressure applied to the nosepiece when a user initially places the device on his or her face. Alternatively, the sensor may detect a pressure and/or movement applied to the nosepiece after a user has placed the device on his or her face, such as when a user manipulates the device in an attempt to better position the device. In another alternative embodiment, a proximity sensor may be used to detect whether a finger is near the center frame support of the device, where a user would most likely press to adjust the device.

The method 600 includes communicating the determined pressure and/or movement to a computing system on the device, at block 620. Threshold values for movement of and/or pressure changes applied to the nosepiece may be set for a sensor, such that the determined pressure and/or movement are not communicated from the sensor unless the movement and/or pressure meet and/or exceed the threshold values. If the sensor is a proximity sensor, the sensor may send the communication to the computing system on the device when the detection is made.

The method 600 includes executing instructions to cause a magnetic field to no longer be applied to fluid in the nosepiece, at block 630. Threshold values for movement of and/or pressure changes applied to the nosepiece may be set for a device, such that the instructions are not executed unless the movement and/or pressure meet and/or exceed the threshold values.

As a result of the executed instructions to cause a magnetic field to no longer be applied to a magnetorheological fluid in the nosepiece, the viscosity of the fluid is decreased. Halting the current of electrons would remove the application of the magnetic field, and as a result, the fluid in the nosepiece would decrease in viscosity and/or rigidity. The nosepiece would thus become malleable once again.

In another embodiment, the method may include executing instructions to cause an electric field to no longer be applied to electrorheological fluid in the nosepiece. As a result of the executed instructions to cause the electric field to no longer be applied to fluid in the nosepiece, the viscosity of the fluid is decreased. Halting the electric field generated by the capacitive plates would result in the fluid in the nosepiece decreasing in viscosity and/or rigidity. The nosepiece would thus become malleable once again.

Following, the method 600 includes receiving an input to increase the hardness of the nosepiece, at block 640. The input may be sent to a device, such as the devices 104 or 160 of FIGS. 1A and 1B, via a user-operable touchpad. In another example, the input may be sent to the device via a user-operable switch. The touchpads or the switches may be mounted on the device in a variety of configurations, as previously described with reference to FIGS. 2 and 3.

The method 600 includes executing instructions to cause the magnetic field to be applied to the fluid in the nosepiece, at block 650. As a result of the executed instructions to cause a magnetic field to be applied to fluid in the nosepiece, the viscosity of the fluid is increased.

In an another embodiment, the method may include executing instructions to cause the electric field to be applied to fluid in the nosepiece, which would result in the viscosity of the fluid increasing.

The method 600 described in FIG. 6 allows a device to determine, via a sensing mechanism, when a user is attempting to place or to adjust his or her hands-free device, and to respond by rendering the nosepiece malleable. When the user has the hands-free device in its desired position, the user can then send an input to the device to harden the fluid in the nosepiece.

3. Example Items on a User Interface

Figure 7:
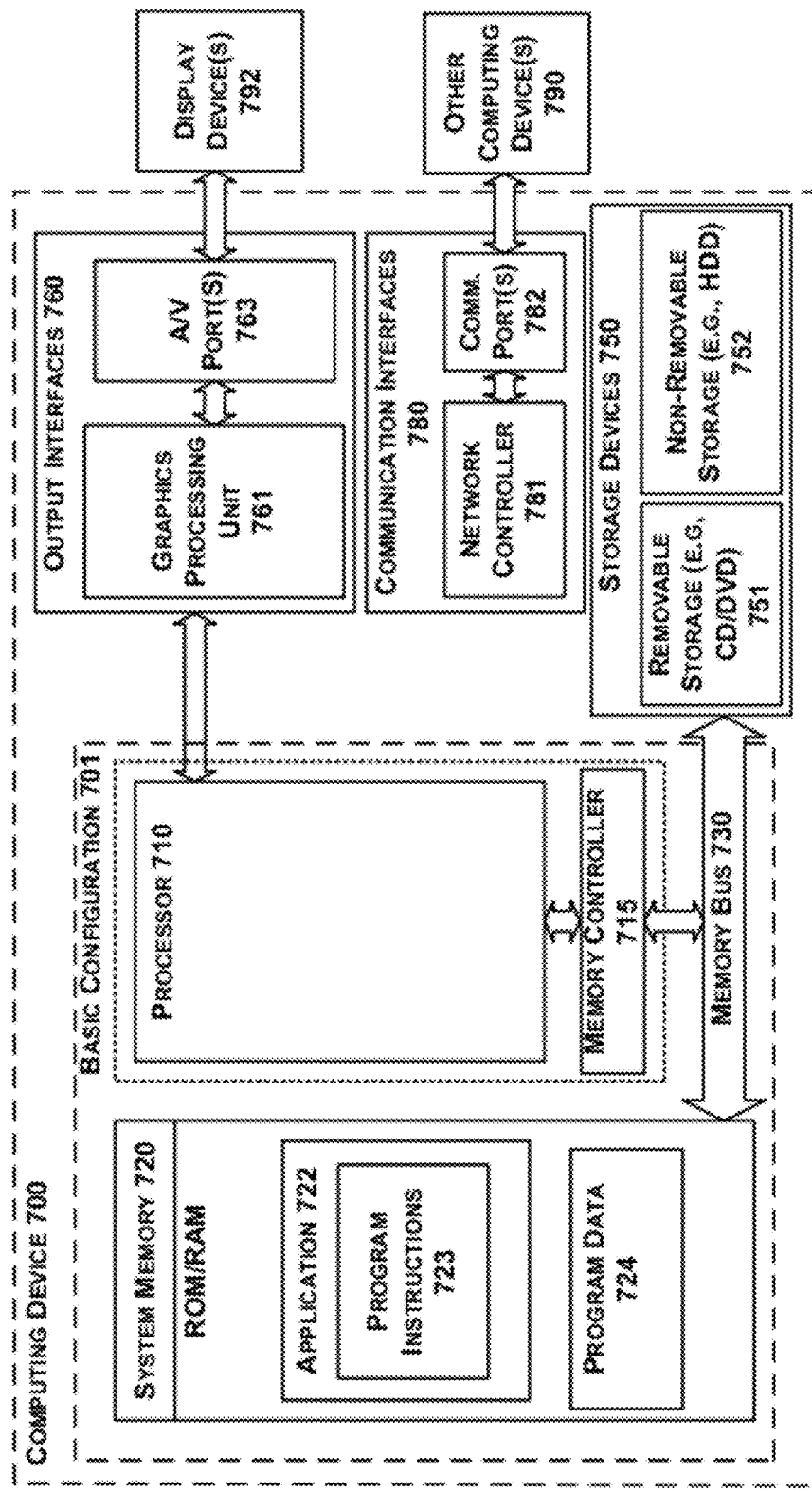
FIG. 7 is a functional block diagram illustrating an example computing device.

FIG. 7 is a functional block diagram illustrating an example computing device used in a computing system that is arranged in accordance with at least some embodiments described herein. The computing device may be a personal computer, mobile device, cellular phone, video game system, or global positioning system. In a very basic configuration 701, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes one or more applications 722, and program data 724. Application 722 may include program instructions 723 that are arranged to provide inputs to the electronic circuits, in accordance with the present disclosure. Program data 724 may include image data 725 that could provide image data to the electronic circuits. In some example embodiments, application 722 can be arranged to operate with program data 724 on an operating system 721. This described basic configuration is illustrated in FIG. 7 by those components within dashed line 701.

Computing device 700 can have additional features or functionality, and additional interfaces to facilitate communications between the basic configuration 701 and any devices and interfaces. For example, the data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 720, removable storage 751, and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 760 that may include a graphics processing unit 761, which can be configured to communicate to various external devices such as display devices 792 or speakers via one or more A/V ports 763 or a communication interface 780. A communication interface 780 may include a network controller 781, which can be arranged to facilitate communications with one or more other computing devices 790 over a network communication via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Figure 8:
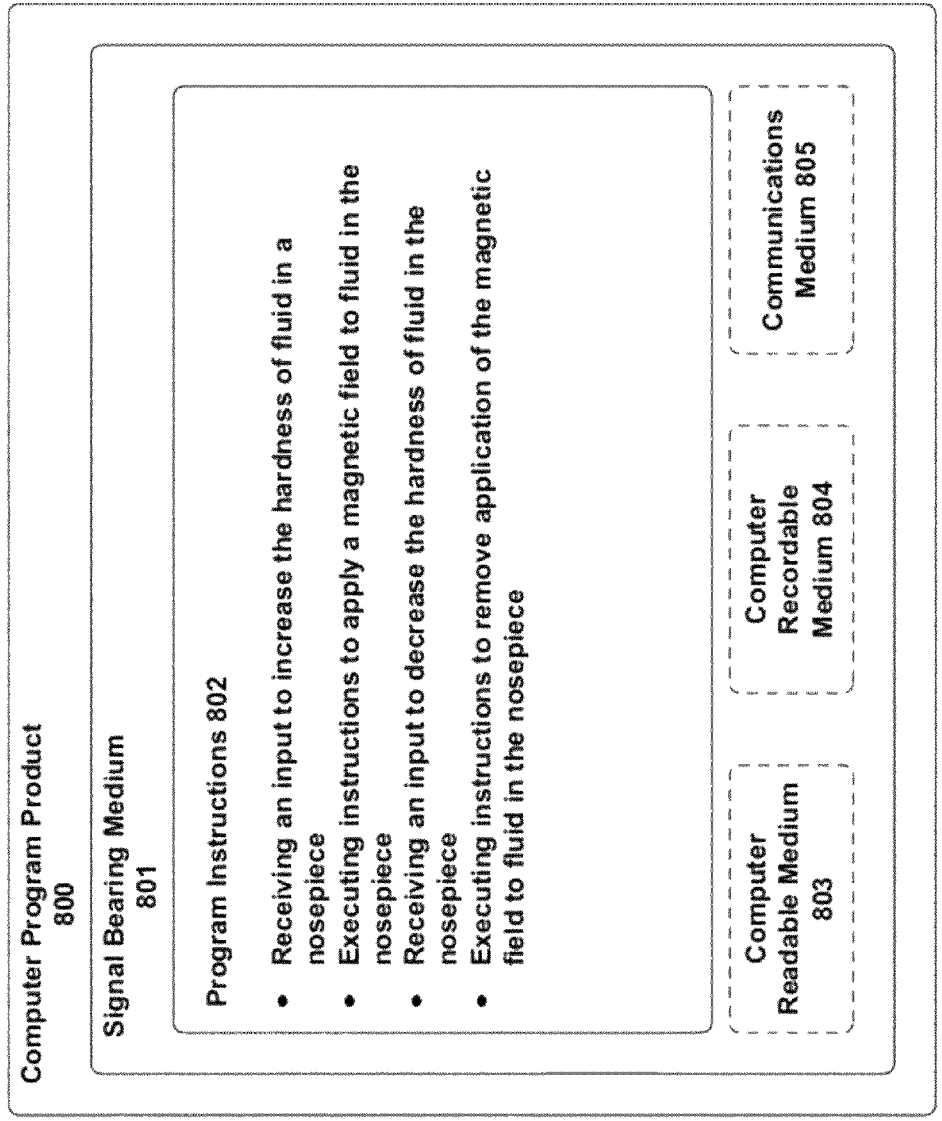
FIG. 8 is a schematic illustrating a conceptual partial view of an example computer program, all arranged in accordance with at east some embodiments of the present disclosure.

In some embodiments, the disclosed methods may be implemented as computer program instructions encoded on a computer-readable storage media in a machine-readable format. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. Thus, for example, referring the embodiment shown in FIGS. 5 and 6, one or more features of blocks 500-560 and 600-670 may be undertaken by one or more instructions associated with the signal bearing medium 801.

In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

In some examples, the above-described embodiments enable a user to communicate hands-free with a user interface, thus providing the user with the freedom of not juggling typing on a device with other tasks, as well as the ability to gather and communicate information in a more natural manner.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A wearable device comprising: a nosepiece comprising: a coating; and a fluid within the coating, wherein the fluid has an electrically-controllable hardness; wherein the wearable device comprises a user interface; wherein the user interface is a touchpad configured to receive an input indicating to apply a magnetic field to the nosepiece, the application of which changes a viscosity of the fluid.

2. The wearable device of claim 1, wherein the input further comprises an indication to compress the fluid in the nosepiece.

3. The wearable device of claim 1, wherein when the viscosity is increased the fluid becomes a viscoelastic solid.

4. The wearable device of claim 1, wherein the input further comprises an indication to compress the fluid in the nosepiece.

5. The wearable device of claim 1, wherein the touchpad is coupled to a bridge of the wearable device.

6. The wearable device of claim 1, wherein the touchpad is coupled to an arm of the wearable device.

7. The wearable device of claim 1, wherein the user interface includes a switch operable to apply a magnetic field to the nosepiece.

8. The wearable device of claim 1, further comprising a sensor configured to detect a pressure applied to the nosepiece and to communicate the pressure to the wearable device.

9. The wearable device of claim 1, wherein the fluid is a magnetorheological fluid.

10. A method of changing a hardness of a nosepiece on a wearable device, the method comprising: causing a magnetic field to be applied to a fluid in the nosepiece; wherein the fluid is a magnetorheological fluid, the method further comprising:

causing a change in viscosity of the magnetorheological fluid in response to application of the magnetic field.

11. The method of claim 10, further comprising receiving a detection of pressure applied to the nosepiece.

12. An article of manufacture including a tangible computer-readable media having computer-readable instructions encoded thereon, the instructions comprising: causing a magnetic field to be applied to a fluid in a nosepiece; wherein the fluid is a magnetorheological fluid and wherein the instructions of causing a magnetic field to be applied to a fluid in the nosepiece comprises causing a change in viscosity of the magnetorheological fluid in response to the application of the magnetic field.

* * * * *